United States Patent [19]

Sugano

[11] Patent Number: 4,585,100
[45] Date of Patent: Apr. 29, 1986

[54] HYDRAULIC CONTROL SYSTEM FOR AUTOMATIC TRANSMISSION HAVING TORQUE CONVERTER WITH LOCK-UP MECHANISM

[75] Inventor: Kazuhiko Sugano, Zama, Japan

[73] Assignee: Nissan Motor Co., Ltd., Yokohama, Japan

[21] Appl. No.: 538,276

[22] Filed: Oct. 3, 1983

[30] Foreign Application Priority Data

Jan. 14, 1982 [JP] Japan .................................. 57-3490

[51] Int. Cl.$^4$ ............................................. F16D 33/00
[52] U.S. Cl. .................................. 192/3.31; 192/3.29
[58] Field of Search ..................... 192/3.29, 3.3, 3.31, 192/0.052, 0.092, 103 F

[56] References Cited

U.S. PATENT DOCUMENTS

| 4,095,486 | 6/1978 | Ohnuma . | |
|---|---|---|---|
| 4,270,636 | 6/1981 | Sunohara et al. | 192/3.31 |
| 4,294,140 | 10/1981 | Iwanaga et al. | 192/3.29 |
| 4,305,487 | 12/1981 | Sunohara . | |
| 4,428,259 | 1/1984 | Kubo et al. | 192/3.31 |

FOREIGN PATENT DOCUMENTS 51-11730  4/1976  Japan .
55-38539 10/1980  Japan .
1270890  4/1972  United Kingdom .

Primary Examiner—Rodney H. Bonck
Assistant Examiner—Alan G. Towner
Attorney, Agent, or Firm—Schwartz, Jeffery, Schwaab, Mack, Blumenthal & Evans

[57] ABSTRACT

A lock-up valve includes a spool movable between a clutch engagement position wherein the lock-up clutch is engaged and a clutch release position wherein the engagement of the lock-up clutch is released. A spring biases the spool toward the clutch release position. The spool has a first pressure acting area and a second pressure acting area. A fluid pressure is applied to the first pressure acting area during operation in the m+th speed ratio (where: m is an integer) and the m+1 th speed ratio to urge the spool against the spring toward the clutch engagement position. A lock-up timing valve is provided which allows the application of another fluid pressure to the second pressure acting area during shifting between the m th speed ratio and the m+1 th speed ratio to urge said spool toward the clutch release position.

2 Claims, 4 Drawing Figures

HYDRAULIC CONTROL SYSTEM FOR AUTOMATIC TRANSMISSION HAVING TORQUE CONVERTER WITH LOCK-UP MECHANISM

CROSS-REFERENCES TO RELATED APPLICATIONS

Reference is made to the following related copending applications, each filed in the name of Kazuhiko Sugano: (1) U.S. patent application Ser. No. 494,647 filed on May 16, 1983; (2) U.S. patent application Ser. No. 507,228 filed on June 23, 1983. Reference is also made to the following related copending applications, each filed in the name of Kazuhiko Sugano concurrently with the present application; (3) U.S. patent application Ser. No. 538,427; and (4) U.S. patent application Ser. No. 538,278.

BACKGROUND OF THE INVENTION

The present invention relates to a hydraulic control system for an automatic transmission having a torque converter with a lock-up mechanism.

In the case of automatic transmissions having a torque converter with a lock-up mechanism, i.e., a mechanism to directly connect a pump impeller to a turbine runner, it is preferrable to actuate the lock-up mechanism from a speed ratio as low as possible. Thus, in the case of an automatic transmission having three forward speed ratios and one reverse speed ratio, it is preferable to keep the lock-up mechanism actuated during operation in each of second and third forward speed ratios. However, if the transmission is shifted between the second and third speed ratios with the lock-up mechanism left actuated, substantial shocks will take place during shifting because torque variation takes place in the circumstance where an input shaft of the transmission is mechanically connected to a crankshaft of an engine. To avoid the shocks, an electronic control system has been needed which senses the commencement and completion of a shifting and generates electric signals for controlling the actuation of the lock-up mechanism. The electronic control system, however, requires a plurality of sensors and actuators, thus resulting in an enormous cost increase. If the same is to be carried out hydraulically, an extremely complicated hydraulic control system is necessary, thus failing to meet the demands for less cost and space saving.

SUMMARY OF THE INVENTION

According to the present invention, a hydraulic control system comprises a lock-up valve including a spool movable between a clutch engagement position and a clutch release position, and a spring biasing the spool toward the clutch release position. The spool has a first pressure acting area which is exposed to a fluid pressure which is present during operation in each of the mth speed ratio and m+1th speed ratio and is urged against the spring toward the clutch engagement position. The spool has a second pressure acting area. Means is provided which applies another fluid pressure to said second pressure acting area during shifting between the m th speed ratio and the m+1th speed ratio to urge said spool toward said clutch release position.

An object of the present invention is therefore to provide a simple hydraulic control system for engaging a lock-up clutch over a plurality of speed ratios and temporarily releasing the engagement at the lock-up clutch during shifting between the speed ratios.

DETAILED DESCRIPTION OF THE INVENTION

Referring to FIGS. 1 to 4, the preferred embodiment according to the present invention is described.

Figure 1:
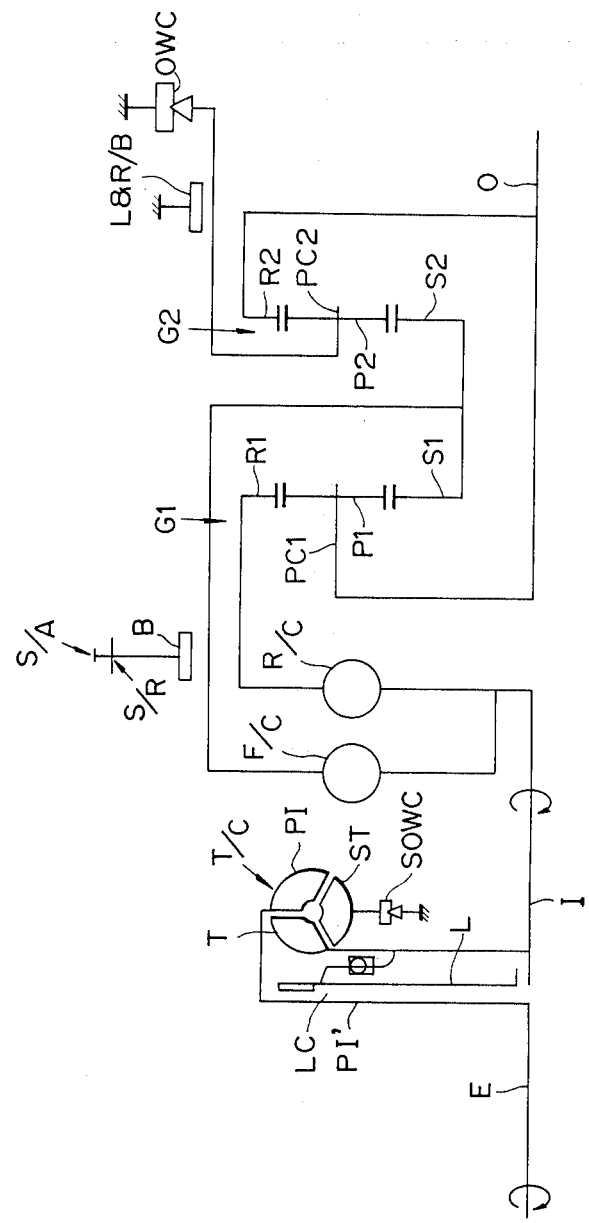
FIG. 1 is a schematic view of a power transmission mechanism of a three-speed automatic transmission.

Referring to FIG. 1, there is shown a schematic view of a power transmission mechanism of a three-speed automatic transmission having three forward speed ratios and one reverse speed ratio. This power transmission comprises an input shaft I to which rotary power is delivered from an engine output shaft E via a torque converter T/C, an output shaft O which transmits driving power to a final drive, a first planetary gear set G1, a second planetary gear set G2, a front clutch F/C, a rear clutch R/C, a band brake B, a low and reverse brake L&R/B, and one-way clutch OWC. The first planetary gear set G1 comprises an internal gear R1, a sun gear S1, and a carrier PC1 carrying pinion gears P1 meshing with the sun gear S1 and internal gear R1 simultaneously. The second planetary gear set G2 comprises an internal gear R2, a sun gear S2, and a carrier PC2 carrying pinion gears P2. The carrier PC1 is connected to an output shaft O, while the sun gear S1 is connectable with an input shaft I via the front clutch F/C, and the internal gear R1 is connectable to the input shaft I via the rear clutch R/C. The internal gear R2 is connected to the output shaft O, and the sun gear S2 is connected to the sun gear S1. The carrier PC2 is prevented from rotating in its reverse direction by the one-way clutch OWC. A low and reverse brake L&R/B is arranged to anchor the carrier PC2. The band brake B is arranged to anchor the sun gears S1 and S2. This band brake B is actuated by a servo having a servo-apply chamber S/A and a servo-release chamber S/R. When the fluid pressure is applied to the servo-apply chamber S/A, the band brake B is applied, while when the fluid pressure is applied to the servo-release chamber S/R, the band brake B is released irrespective of the presence of the fluid pressure in the servo apply chamber S/A. The torque converter T/C includes a pump impeller PI, a turbine runner R, a stator ST and a lock-up clutch L. The pump impeller PI is connected via a torque converter cover PI' to the engine output shaft E. The turbine runner T is connected to the input shaft I, and the stator ST is connected via a one-way clutch SWOC to a stationary portion of the transmission. The lock-up clutch L connected to the turbine runner T is axially movable and defines a lock-up clutch fluid pressure chamber LC in cooperation with the torque converter cover PI'. The lock-up clutch L is pressed against the torque converter cover PI' when fluid pressure in the lock-up clutch fluid pressure chamber LC is lower than that within the torque converter T/C and rotates integrally with the torque converter cover PI'. The detail construction of the lock-up clutch L is described in U.S. Pat. No. 4,305,487 issued Dec. 15, 1981 to Sunohara.

The front clutch E/C, rear clutch R/C, band brake B and low and reverse brake L&R/B (one-way clutch OWC) are engageable in the predetermined combinations shown by the following Table to provide three forward speed ratios and one reverse speed ratio.

TABLE

|  | F/C | R/C | L&R/B (OWC) | B S/A | B S/A |
|---|---|---|---|---|---|
| First speed |  | o | o |  |  |
| Second speed |  | o |  |  | o |
| Third speed | o | o |  | o |  |
| Reverse | o |  | o |  | o |

In the Table, the sign "o" indicates for each of clutches and brakes, the clutch or brake in question is engaged or applied. What is denoted by a label (OWC) below the brake B1 means that the first speed ratio is established by the one-way clutch OWC even if the brake B1 is not applied. However, in this first speed ratio, it is not possible for the output shaft O to drive the engine (that is, no engine braking is provided). What is indicated by the sign "o" in the column below B means that the servo apply chamber S/A and/or servo release chamber S/R in question are supplied with fluid pressure.

Figure 2:
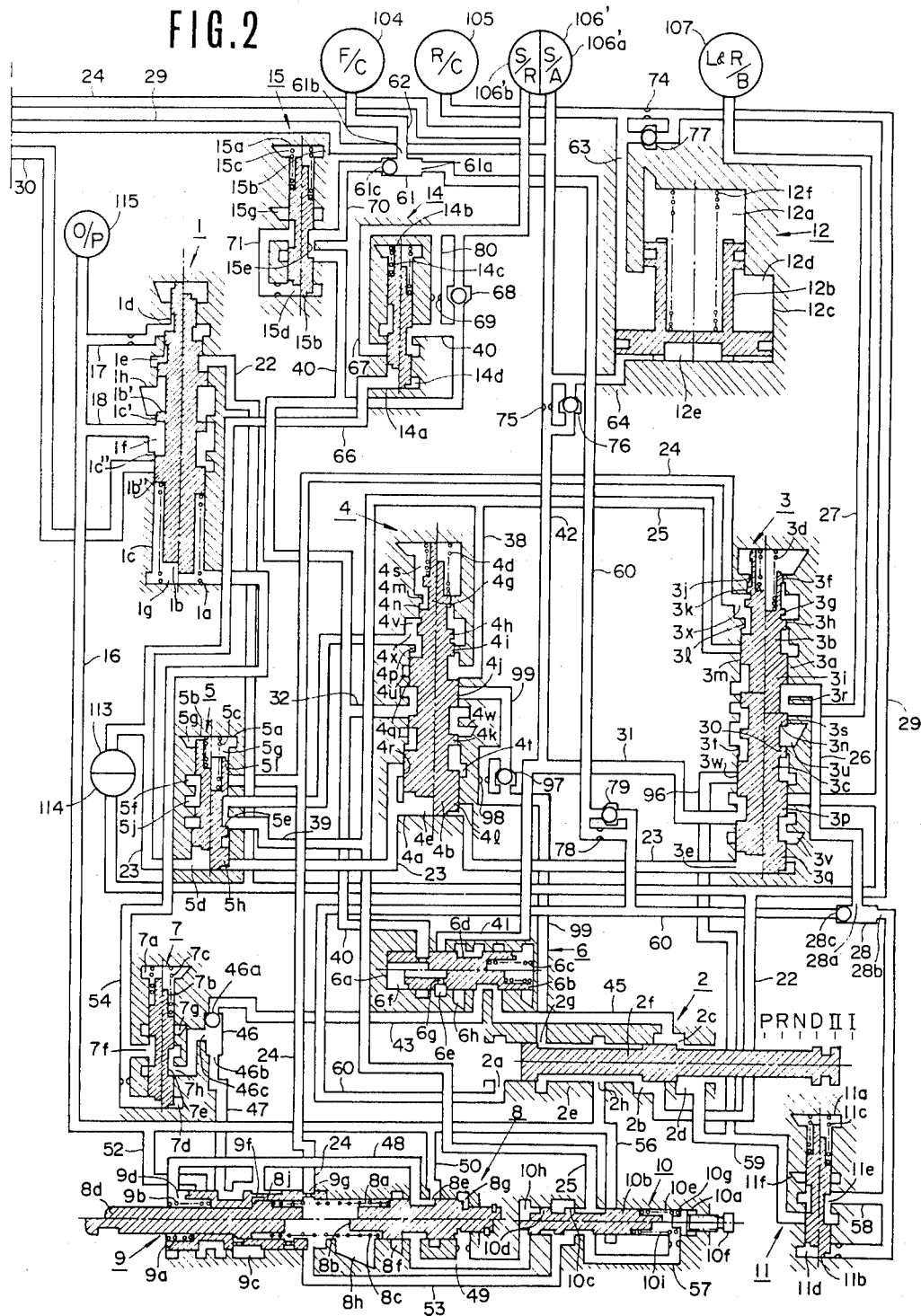
FIGS. 2 and 3, when combined, illustrate a circuit diagram of a preferred embodiment of a hydraulic control system according to the present invention.
Figure 3:
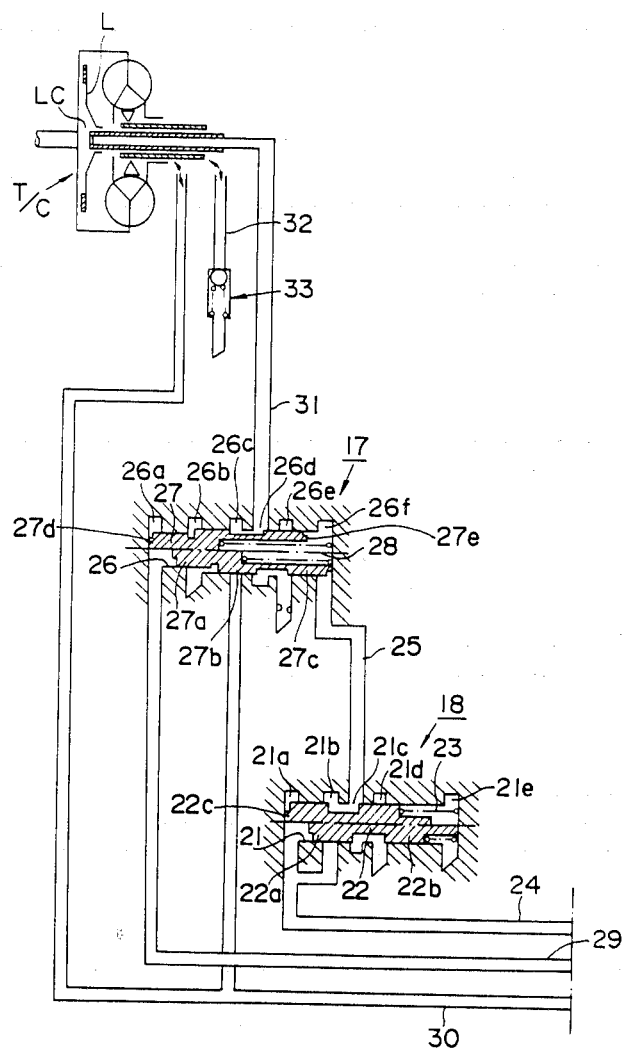

Referring to FIGS. 2 and 3, the hydraulic control system comprises a regulator valve 1, a manual valve 2, a 1-2 shift valve 3, a 2-3 shift valve 4, a 3-2 downshift valve 5, a line pressure booster valve 6, a pressure modifier valve 7, a throttle valve 8, a throttle fail-safe valve 9, a throttle modulator valve 10, a first manual range pressure reducing valve 11, an accumulator 12, a 3-2 timing valve 14, a front clutch pressure reducing valve 15, governor valves 113, 114, a lock-up valve 17, a lock-up timing valve 18. As illustrated, these valves are connected with the torque converter T/C, lock-up clutch fluid chamber LC, front clutch F/C, rear clutch R/C, servo apply chamber S/A of the band brake B, servo release chamber S/R of the band brake B, low and reverse brake L&R/B, and oil pump O/P. The hydraulic control system is substantially the same as that of co-pending U.S. patent application Ser. No. 351,746 (our ref.: U169-81) filed Feb. 24, 1982 by Kazuhiko SUGANO et al. (see FIG. 2) and commonly assigned herewith. The hydraulic control system according to the present invention is different from that described in U.S. patent application Ser. No. 351,746 in the provision of the lock-up valve 17 and lock-up timing valve 18 for controlling the lock-up clutch L. More particularly, the lock-up valve 17 and lock-up timing valve 18 are connected with a fluid conduit 29 which is pressurized when the hydraulic control system shown in FIG. 2 is conditioned for each of the second speed ratio and the third speed ratio and also with another fluid conduit 24 which is pressurized when the hydraulic control system shown in FIG. 2 is conditioned for the third speed ratio.

The lock-up timing valve 18 comprises a spool 22 axially slidable in a valve bore 21, and a spring 23 biasing the spool 22 to the left as viewed in FIG. 3. The valve bore 21 has ports 21a, 21b, 21c, 21d and 21e. The spool 22 has lands 22a and 22b which have the same diameter. The spool 22 has a pressure acting area 22c formed on the lefthand end thereof as viewed in FIG. 3. The ports 21a and 21b communicate with the fluid conduit 24 connected with the servo release chamber S/R (see FIG. 2). The port 21c communicates via the fluid conduit 25 with a port 26f of the lock-up valve 17. The ports 21d and 21e are drain ports, respectively.

The lock-up valve 17 comprises a spool 27 axially slidable in a valve bore 26, and a spring 28 biasing the spool 27 to the left as viewed in FIG. 3. The valve bore 26 has ports 26a, 26b, 26c, 26d, 26e and 26f. The spool 27 has lands 27b and 27c which have the same diameter and a land 27a. The land 27a has a diameter smaller than that of the lands 27b and 27c. The spool 27 has a pressure acting area 27d formed on the lefthand end thereof as viewed in FIG. 3 and another pressure acting 27e on the righthand end thereof. The port 26a communicates with a fluid conduit 29 connected with the servo apply chamber S/A. The port 26c communicates with a fluid conduit 30 through which pressurized fluid is supplied from the regulator valve 1 to the torque converter T/C. The port 26d communicates with the lock-up clutch fluid chamber LC through a fluid conduit 31. The port 26f communicates with the port 21c of the lock-up timing valve 18. The ports 26b and 26e are drain ports, respectively. The fluid is supplied to the torque converter T/C from the fluid conduit 30 and discharged to the fluid conduit 32. The fluid in the fluid conduit 32 is drained via a pressure maintaining valve 33. The fluid pressure within the torque converter T/C, i.e., a torque converter supply fluid pressure, is determined by the pressure maintaining valve 33. The lock-up fluid chamber LC within the torque converter T/C communicates with the fluid conduit 31.

The operation is described.

In the first speed ratio, no fluid pressure is supplied to the servo apply chamber S/A and the servo release chamber S/R, Thus, no fluid pressure exists in the fluid conduits 24 and 29. Under this condition, since no fluid pressure is supplied to the port 26a of the lock-up valve 17 and the port 21a of the lock-up timing valve 18, the spools 27 and 22 are in positions illustrated by upper halves thereof, respectively, as viewed in FIG. 3. This allows the fluid conduit 30 to communicate with the fluid conduit 31, supplying the lock-up clutch fluid chamber LC with the same fluid pressure as that supplied to the torque converter T/C. As a result, the lock-up clutch L is disengaged because the fluid pressure within the lock-up clutch fluid chamber LC becomes equal to that within the torque converter T/C.

As the vehicle speed increases, the 1-2 shift valve 3 switches from a first speed ratio position thereof as illustrated by right half thereof as viewed in FIG. 2 to a second speed ratio position thereof as illustrated by left half thereof as viewed in FIG. 2. This results in the supply of fluid pressure to the servo apply chamber S/A, supplying the same fluid pressure to the fluid conduit 29. This fluid pressure acts via the port 26a on the pressure acting area 27d of the spool 27 of the lock-up valve 17, urging the spool 27 to move to the position illustrated by the bottom half thereof as viewed in FIG. 3. In this position of the spool 27, the port 26c communicating with the fluid conduit 30 is closed by the land 27b and the drain port 26e is opened to communicate with the fluid conduit 31. As a result, the lock-up clutch L is engaged because the fluid within the lock-up clutch fluid chamber LC is discharged via the fluid conduit 31 and port 26d to the drain port 26e.

Figure 4:
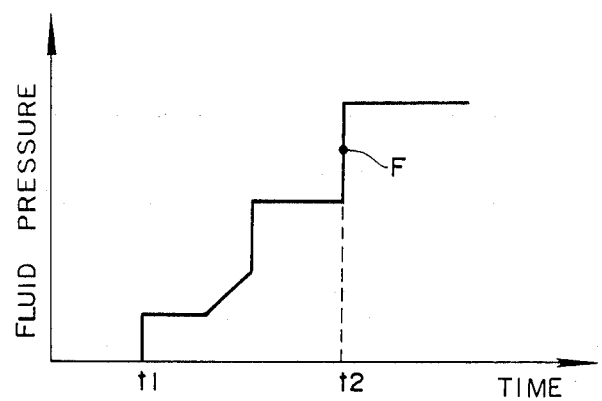
FIG. 4 is a graph showing how the fluid pressure within the servo release chamber S/A varies during shifting between the speed ratios.

When, subsequently, the 2-3 shift valve 4 switches from a second speed ratio position as illustrated by right half thereof as viewed in FIG. 2 to a third speed ratio position thereof as illustrated by left half thereof as viewed in FIG. 2, the fluid pressure within the servo release chamber S/R starts to increase. The fluid pressure within the servo release chamber S/R increases as shown in FIG. 4. This fluid pressure is supplied via the fluid conduit 24 to the ports 21a and 21b, acting on the pressure acting area 22c of the spool 22 of the lock-up timing valve 18, thus urging the spool 22 to move to the right as viewed in FIG. 3. However, such rightward movement of the spool 22 is resisted by the spring 23 which is set to prevent the spool 22 from switching its position until the fluid pressure increases up to a valve indicated by a reference character F in FIG. 4. Therefore, the port 21b is still in communication with the port 21c during a period from t1 to t2 in FIG. 4, allowing the same fluid pressure as that within the servo release chamber S/R to appear in the fluid conduit 25 during this period. This fluid pressure acts via the port 26f on the pressure acting area 27e of the lock-up valve 17, urging the spool 27 to move in the direction to assist the action of the spring 28 toward the position as illustrated by the upper half thereof as viewed in FIG. 3. The setting of the spring 28 is such that the spool 27 will move from the position as illustrated by the lower half thereof as viewed in FIG. 3 to the position as illustrated by the upper half thereof as viewed in FIG. 3 against the fluid pressure acting via the port 26a on the pressure acting area 27d even if the fluid pressure acting via the port 26f on the pressure acting area 27e is relatively low. Thus, the spool 27 will move to the position as illustrated by the upper half position thereof as viewed in FIG. 3 on or immediately after the appearance of the fluid pressure in the fluid conduit 25, releasing the engagement of the lock-up clutch L like the manner described before. When the fluid pressure in the fluid conduit 24 exceeds the value denoted by the reference character F, the lock-up timing valve 18 moves against the action of the spring 23 to the position as illustrated by the lower half thereof as viewed in FIG. 3, wherein the fluid in the fluid conduit 25 is discharged via the drain port 21d. This causes the spool 27 of the lock-up valve 17 to move back to the position as illustrated by the upper half thereof as viewed in FIG. 3. As a result, the lock-up clutch L is reengaged. It will be understood that the lock-up valve 17 temporarily assumes the position as illustrated by upper half thereof as viewed in FIG. 3 to release the lock-up clutch L during the period from t1 to t2 (see FIG. 4). Therefore, the engagement of the lock-up clutch L is released temporarily during shifting from the second speed ratio to the third speed ratio, thus avoiding substantial shocks during shifting.

The engagement of the lock-up clutch L is temporarily released during shifting from the third speed ratio to the second speed ratio in the similar manner. When the 2-3 shift valve 4 switches from the third speed ratio position thereof to the second speed ratio position thereof, the fluid pressure within the servo release chamber S/R, i.e., the fluid pressure in the port 21a of the lock-up timing valve 18 starts to decrease. When this fluid pressure slightly decreased, the spool 22 of the lock-up timing valve 18 switches from the position as illustrated by the lower half thereof as viewed in FIG. 3 to the position as illustrated by the upper half thereof as viewed in FIG. 3. As a result, the ports 21b is allowed to communicate with the port 21c, allowing the fluid pressure in the fluid conduit 24 to appear in the fluid conduit 25 to act via the port 26f on the pressure acting area 27e of the spool 27 of the lock-up valve 17, thus urging the spool 27 to move from the position as illustrated by the lower half thereof as viewed in FIG. 3 to the position as illustrated by the upper half thereof as viewed in FIG. 3. Thus, the lock-up clutch L is disengaged. The lock-up clutch L is reengaged when the fluid pressure within the servo release chamber S/R has decreased to a sufficiently low value to allow the speed 27 to take the position as illustrated by lower half thereof as viewed in FIG. 3. Therefore, the engagement of the lock-up clutch L is released during shifting from the third speed ratio to the second speed ratio, thus avoiding substantial shocks.

Although in the preceding description relating to the above embodiment, the fluid pressure within the servo apply chamber S/A and that within the servo release chamber S/R which contribute to the shifting between the second speed ratio and the third speed ratio have been used, the present invention may be embodied if there are two kinds of fluid pressures, a first one being present during operation in each of the mth (m is an integer) speed ratio and the m+1th speed ratio, and a second one being present during operation in one of the m th speed ratio and the m+1th speed ratio and absent in the other speed ratio. In this case, the first one is supplied to the port 26a of the lock-up valve 17, while the second one is supplied to the ports 21a and 21b of the lock-up timing valve 18. This hydraulic circuit permits a fluid pressure to appear in the fluid conduit 25 during shifting and the lock-up clutch L is disengaged temporarily.

What it claimed is:

1. In a hydraulic control system for an automatic transmission having a torque converter with a lock-up clutch, the automatic transmission having a plurality of forward speed ratios including a mth speed ratio and a m+1th speed ratio, where: m is an integer, the hydraulic control system having a portion wherein a fluid pressure is present during operation in each of the mth speed ratio and m+1th speed ratio, a lock-up valve including a spool movable between a clutch engagement position wherein the lock-up clutch is engaged and a clutch release position wherein the engagement of the lock-up clutch is released, and a spring biasing said spool toward the clutch release position;

said spool of said lock-up valve having a first pressure acting area which is exposed to the fluid pressure in the portion of the hydraulic control system and being urged against said spring toward the clutch engagement position, said spool having a second pressure acting area;

means for applying another fluid pressure to said second pressure acting area during shifting between the mth speed ratio and the m+1th speed ratio to urge said spool toward said clutch release position.

2. A hydraulic control system as claimed in claim 1, wherein said applying means includes a lock-up timing valve which is connected with said lock-up valve via a fluid conduit at a port to which said second pressure acting area is exposed, said lock-up timing valve comprising a bore having an outlet port connected with said fluid conduit, an inlet port connected with a second portion of the hydraulic control system wherein a fluid pressure is present during operation in one of the mth speed ratio and the m+1th speed ratio and absent during operation in the other speed ratio, and a drain port, said lock-up timing valve futher comprising a spool movable between a first position wherein said outlet port communicates with said drain port only and a second position wherein said outlet port communicates with said inlet port only, and a spring biasing said spool of said lock-up timing valve toward said second position thereof, said spool of said lock-up timing valve having a pressure acting area exposed to said fluid pressure in said second portion and being urged against said spring of said lock-up timing valve toward said first position thereof.

* * * * *